J. A. DE CEW.
PROCESS OF RECOVERING ESCAPING ACID GASES FROM SULFITE TOWERS.
APPLICATION FILED NOV. 13, 1911.
1,077,243.
Patented Oct. 28, 1913.
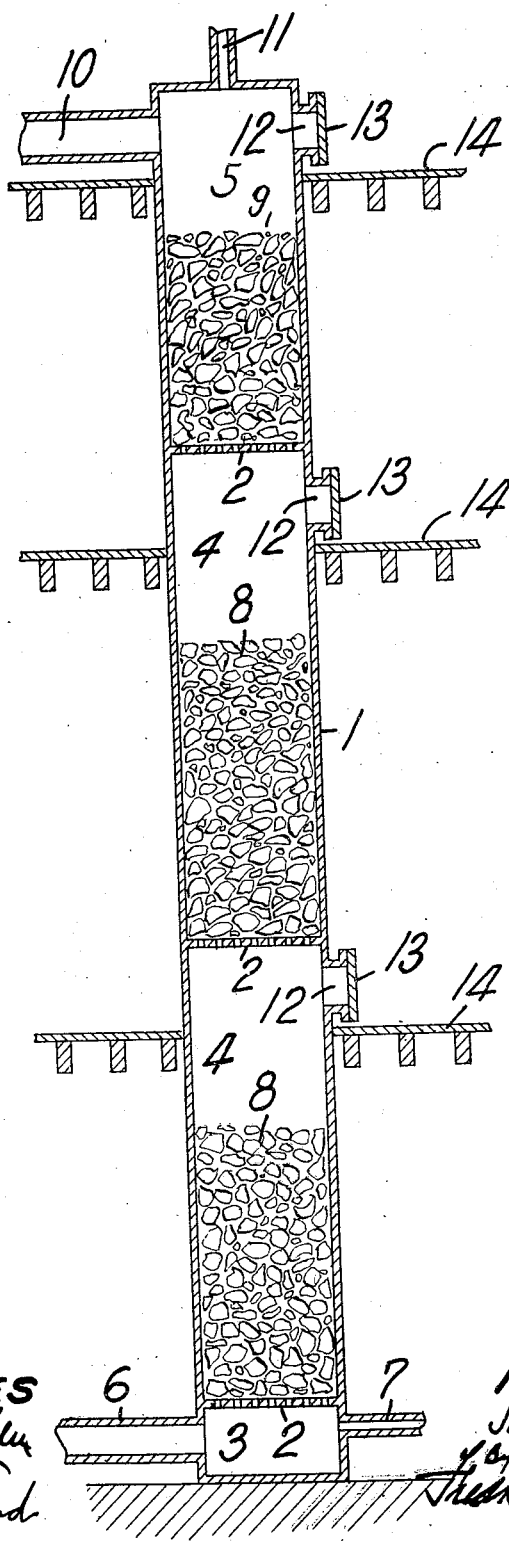
WITNESSES
INVENTOR
Judson A. DeCew.

UNITED STATES PATENT OFFICE.

JUDSON A. DE CEW, OF MONTREAL, QUEBEC, CANADA

PROCESS OF RECOVERING ESCAPING ACID-GASES FROM SULFITE-TOWERS.

1,077,243.  Specification of Letters Patent.  Patented Oct. 28, 1913.

Application filed November 13, 1911.  Serial No. 659,944.

*To all whom it may concern:*

Be it known that I, JUDSON A. DE CEW, of the city of Montreal, in the Province of Quebec and Dominion of Canada, have invented certain new and useful Improvements in Processes of Recovering Escaping Acid-Gases from Sulfite-Towers, and do hereby declare that the following is a full, clear, and exact description of the same.

This invention relates to a process of recovering escaping acid gases from the sulfite towers used in the manufacture of sulfite liquor for pulp making.

In the manufacture of sulfite pulp, the liquor is usually prepared in towers, or their equivalent, packed with limestone by forcing gas from a sulfite burner up through the limestone while a stream of water passes down. The water and sulfur gas combine and form sulfurous acid which in turn attacks the limestone and produces the sulfite liquor. Ordinarily, the sulfur gas is composed of from 12% to 17% sulfur dioxid, by volume, the balance being mostly nitrogen, and this gas leaves the tower containing from 1% to 2% sulfur dioxid. Therefore, if no gas leaks out of the towers the loss is about 10% of the amount entering. In many towers, however, provided with exhaust fans, the loss amounts to from 15% to 20%. In order to overcome this loss, I pass the gas through moistened stones of magnesia.

The apparatus for carrying out this recovery process is illustrated in the accompanying drawing.

Referring to the drawing, 1 designates a tower of suitable dimensions provided at intervals with horizontal apertured diaphragms 2 which divide the tower in chambers 3, 4 and 5. The chamber 3 at the bottom of the tower is provided with a gas inlet pipe 6 from a sulfur burner and with an outlet pipe 7 for the sulfite liquor. The chambers 4 are for the reception of limestone ($CaCO_3$), 8 on which the water and sulfurous acid acts. The upper chamber 5 contains calcined magnesia 9 and is provided with a gas outlet pipe 10 and a water inlet pipe 11. The chambers 4 and 5 are provided at the top with suitable charging apertures 12 closed by doors 13. Adjacent the doors are loading floors or platforms 14.

The operation is as follows:—Sulfur dioxid ($SO_2$) is supplied through the pipe 6, and rises through the limestone which is kept wet with water from the pipe 11. The water and sulfur dioxid combine and form sulfurous acid which attacks the limestone, the product being the sulfite liquor which falls into the chamber 3 and is drawn off through the pipe 7. The nitrogen which enters with the sulfur dioxid and also other gas liberated by the chemical action escape through the pipe 10. The reaction is as follows:—

$H_2O$ and $SO_2 = H_2SO_3$
$H_2SO_3$ and $CaCO_3 = CaSO_3$ and $H_2O$ and $CO_2$
$H_2SO_3$ and $CaSO_3 = CaH_2(SO_3)_2$.

In the second line of the reaction where the $CO_2$ in the stone is replaced by $SO_2$ in the acid the rate of the action depends on the strength of the acid. Therefore toward the top of the tower the stone is very slowly attacked because the acidity of the water is so slight. There is also a small percentage of unabsorbed gas which is lost. The additional chamber 5 containing calcined magnesia, preferably in lump form prevents this loss. The magnesia does not slack like lime and also absorbs the sulfur dioxid much more readily than limestone. The acid which would be too weak to attack limestone is absorbed by the magnesia and is recovered as magnesium sulfite and bisulfite.

The apparatus need not necessarily be a tower but may be a series of intercommunicating vessels arranged in a train, the final vessel of the train being charged with calcined magnesia.

Having now fully described my invention, I declare that what I claim is:—

1. A process of recovering escaping acid gas in the manufacture of sulfite liquor which consists in passing the escaping gas through chambers containing moistened limestone and then through a chamber containing moistened calcined magnesite.

2. A process of recovering escaping gas in the manufacture of sulfite liquor which consists in passing the escaping gas successively through chambers containing moistened limestone and moistened calcined magnesite in lump form.

In witness whereof I have hereunto set my hand in the presence of two witnesses.

JUDSON A. DE CEW.

Witnesses:
 STUART R. W. ALLEN,
 G. M. MORELAND.

Copies of this patent may be obtained for five cents each, by addressing the "Commissioner of Patents, Washington, D. C."